(12) United States Patent
Jeong

(10) Patent No.: US 6,477,607 B1
(45) Date of Patent: Nov. 5, 2002

(54) DUPLEXING STRUCTURE OF SWITCHING SYSTEM PROCESSOR AND METHOD THEREOF

(75) Inventor: Sang-Ik Jeong, Kyungki-Do (KR)

(73) Assignee: LC Information & Communications, Ltd., Seoul (KR)

( * ) Notice: Subject to any disclaimer, the term of this patent is extended or adjusted under 35 U.S.C. 154(b) by 0 days.

(21) Appl. No.: 09/470,981

(22) Filed: Dec. 23, 1999

(30) Foreign Application Priority Data

Dec. 24, 1998 (KR) .............................. 98-57918

(51) Int. Cl.$^7$ .................. G06F 13/00; G06F 11/20; G06F 12/00; G06F 13/38
(52) U.S. Cl. ...................... 710/305; 714/10; 710/62
(58) Field of Search ........................... 710/52, 62, 100, 710/316, 107, 300, 301, 305, 310; 714/3, 10; 713/600, 501; 370/216, 276, 429; 379/279; 711/100, 148

(56) References Cited

U.S. PATENT DOCUMENTS

| | | | |
|---|---|---|---|
| 3,889,237 A | | 6/1975 | Alferness et al. |
| 4,418,382 A | * | 11/1983 | Larson et al. |
| 4,654,819 A | | 3/1987 | Stiffler et al. |
| 5,123,099 A | | 6/1992 | Shibata et al. |
| 5,448,558 A | * | 9/1995 | Gildea et al. |
| 5,495,615 A | * | 2/1996 | Nizar et al. |
| 5,978,874 A | * | 11/1999 | Singhal et al. |
| 6,327,670 B1 | * | 12/2001 | Hellenthal et al. |

* cited by examiner

*Primary Examiner*—Gopal C. Ray
(74) *Attorney, Agent, or Firm*—Fleshner & Kim, LLP

(57) ABSTRACT

A duplexing structure of a switching system processor in which a duplexing channel is formed through a back plane to implement duplexing in an active mode and a standby mode includes first and a second processor boards for which a duplexing channel is formed through a back plane and being dually operated in an active mode and in a standby mode, wherein each processor bus connected to a microprocessor of a processor board at one side, and a duplexing channel connected to a processor board at the other use a different clock so that the two processor boards are independently operated.

19 Claims, 5 Drawing Sheets

------- ADDRESS AND CONTROL SIGNAL
——— DATA AND STATUS INFORMATION

- - - - - - - ADDRESS AND CONTROL SIGNAL
———— DATA AND STATUS INFORMATION

DUPLEXING STRUCTURE OF SWITCHING SYSTEM PROCESSOR AND METHOD THEREOF

BACKGROUND OF THE INVENTION

1. Field of the Invention

The present invention relates to a switching system processor, and more particularly, to a duplexing structure of a switching system processor and its method.

2. Background of the Related Art

In general, a switching system includes a plurality of processors, which are required to process data on a real time basis, and are managed by a duplexing channel to prevent an interruption in processing of data, even when a malfunction occurs. A duplexing channel is generally formed through a back plane between two processor boards having the same construction, so that while one processor is operating in an active mode, the other processor is operating in a standby mode. When a disturbance occurs at the active mode processor, the standby mode processor is switched to an active mode to successively perform the data processing.

FIG. 1 shows a duplexing structure of a background art switching system processor. In this drawing, two processors 10 and 20, for implementing an actual duplexing operation have similar construction, and a duplexing channel is formed through a back plane. A requisite portion for a duplexing operation of the two processors 10 and 20 are shown in FIG. 1 illustrating a case where the first processor 10 is operating in an active mode while the second processor 20 is operating in a standby mode. A description and a drawing for the opposite case are omitted.

The first processor 10, the active mode processor, includes a microprocessor 11, a duplexing controller 12, an address FIFO 13, an address buffer 14, a data buffer 15, a data FIFO 16, a memory controller 17 and a memory 18. The second processor 20, the standby mode processor, includes a microprocessor 21, a bus arbitration unit 22, an address buffer 23, a data buffer 24, a memory controller 25 and a memory 26.

If use of a processor bus of the second processor 20 is required while the microprocessor 11 is reading or writing data, the duplexing controller 12 requests use of the bus from the bus arbitration unit 22 and controls the address FIFO 13, the data FIFO 16, the address buffer 14 and the data buffer 15, for transmitting the address and the data signals.

When the microprocessor 11 performs a concurrent writing operation into the memories 18 and 26 under the control of the duplexing controller 12, the address FIFO 13 and the data FIFO 16 temporarily store the address and the data.

The address buffers 14 and 23 and the data buffers 15 and 24 offer a transfer path for the address and the data signal, respectively, when the data is read from or written into the memory 26 of the second processor 20.

At the request for use of the bus by the duplexing controller 12, the bus arbitration unit 22 monitors use of the bus by the microprocessor 21, arbitrates the use of the bus between the displaying controller 12 and the microprocessor 21, and controls the address buffer 23 and the data buffer 24.

If the microprocessor 11 of the first processor 10 is intended to read the data stored in the memory 26 of the second processor 20, the duplexing controller 12 requests use of the bus from the bus arbitration unit 22. Upon authorization from the bus arbitration unit 22, the duplexing controller 12 and the bus arbitration unit 22 control the address buffers 14 and 23, respectively, to offer a transfer path for the address signal, read a data from a corresponding address of the memory 26 and transfer the data to the microprocessor 11 through the data buffers 24 and 15.

If the microprocessor 11 writes a data into the memory 26, the duplexing controller 12 requests use of the bus from the bus arbitration unit 22. Upon authorization, the duplexing controller 12 and the bus arbitration unit 22 control the address buffers 14 and 23 and the data buffers 15 and 24, respectively, to offer a transfer path for the address and the data, through which the data is written into a corresponding address of the memory 26.

If the microprocessor 11 is intending to concurrently write a data into both of the memories 18 and 26, that is, the data carried on the address signal outputted from the microprocessor 11 is a data to be duplexed, then data writing is performed into the memory 18 through the memory controller 17, and simultaneously, the data is temporarily stored in the data FIFO 16, and its address signal is temporarily stored in the address FIFO 13 under the control of the duplexing controller 12.

If a request by the duplexing controller 12 for use of the bus from the bus arbitration unit 22 is allowed, the address signal and the data stored in the address FIFO 13 and the data FIFO 16 are written into the memory 26 through the address buffer 23 and the data buffer 24.

Regarding the duplexing structure of the background art switching system processor, since the duplexing channel between the active mode processor 10 and the standby mode processor 20 is only separated from the processor bus by the address buffer 23 and the data buffer 24 in the standby mode processor 20, the actual clock speed of the duplexing channel must be the same as the actual clock speed of the processor bus. However, since the duplexing of the switching system processor is made through the back plane, if the clock signal of the duplexing channel formed through the back plane is of high frequency, the phases of the signals transmitted between the two processors may not be identical.

Therefore, for a high-performance microprocessor requiring a higher speed processor bus clock, since the clock speed of the duplexing channel formed between the dual processors hardly meets the speed of the bus clock of the higher speed processor, there occurs a problem in that the high-performance microprocessor is limited in use with such a duplexing structure of the background art.

SUMMARY OF THE INVENTION

An object of the invention is to solve at least the above problems and/or disadvantages and to provide at least the advantages described hereinafter.

Another object of the present invention is to provide a duplexing structure of a switching system processor.

Another object of the present invention is to implement a duplexing channel using an independent clock.

Another object of the present invention is to form a duplexing channel.

Another object of the present invention is to implement a duplexing operation in an active mode and a standby mode.

The object of the present invention can be obtained, as a whole or in parts, by a duplexing structure of a switching system processor having first and second processor boards for which a duplexing channel is formed through a back plane and is dually operated in an active mode and in a standby mode, wherein each processor bus connected to a microprocessor of a processor board at one side and a duplexing channel connected to a processor board at the other side use different clocks so that the two processor boards are independently operated.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
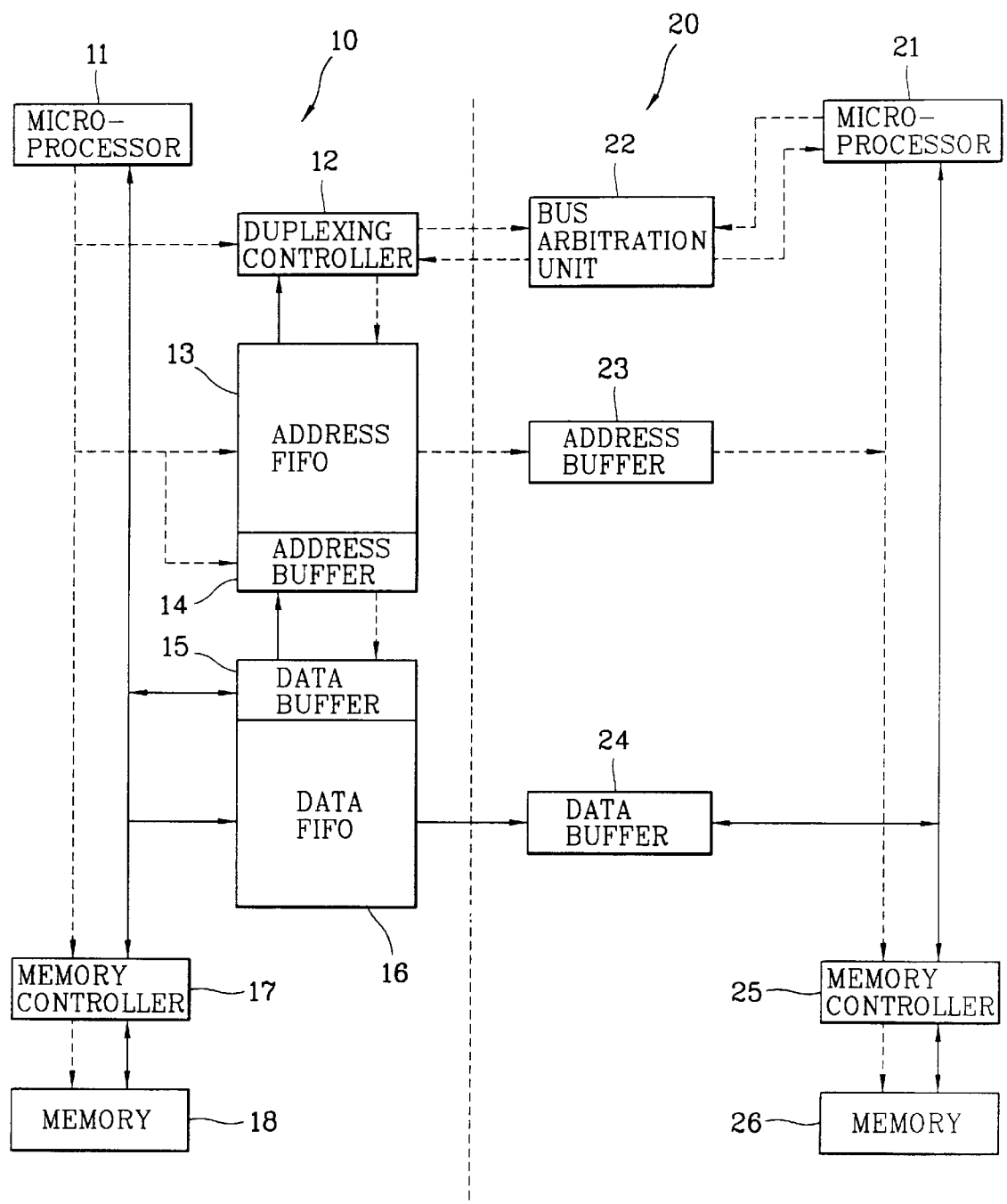
FIG. 1 is a schematic view of a duplexing structure of a switching system processor in accordance with a background art.
Figure 2:
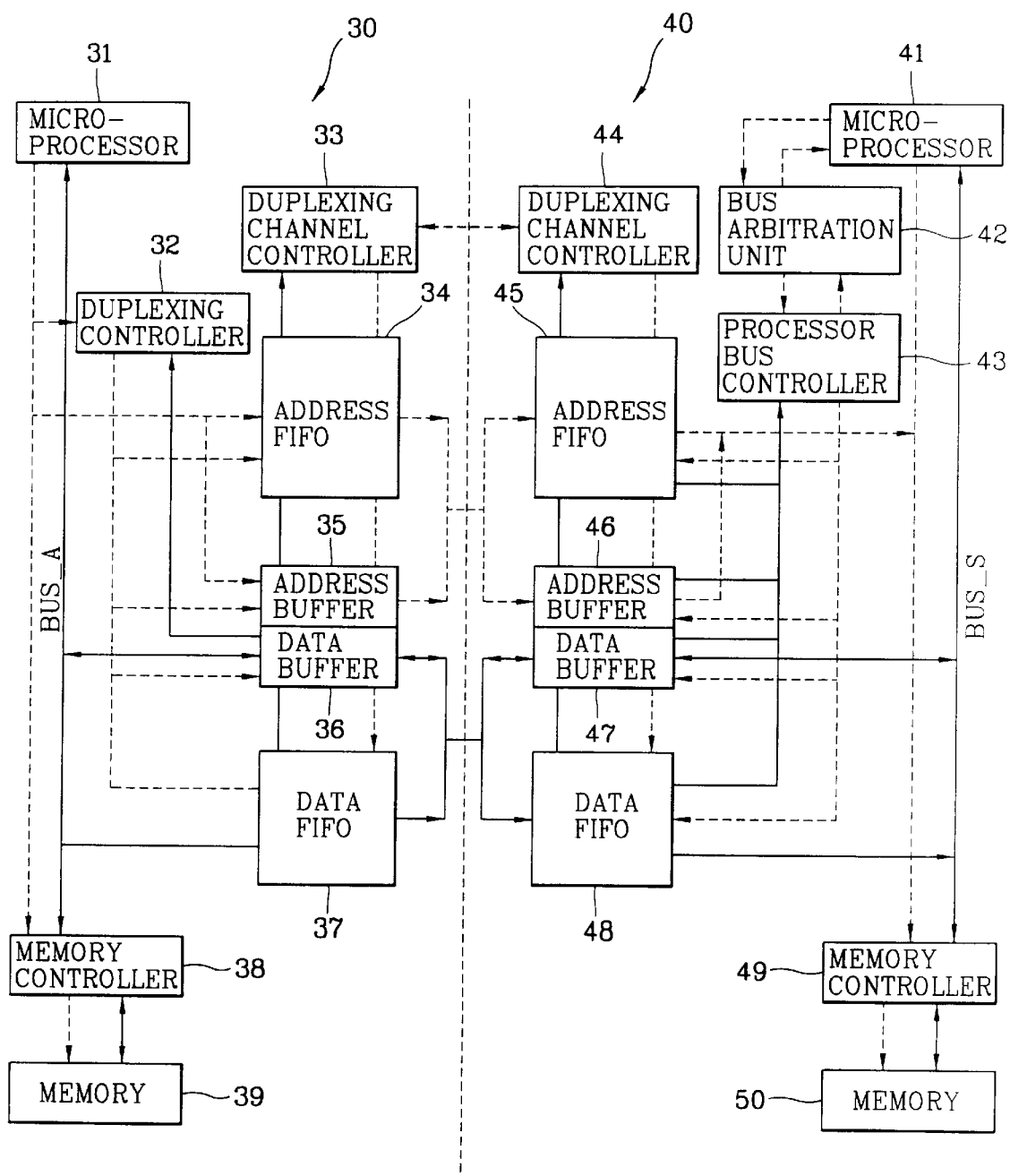
FIG. 2 is a schematic view of a duplexing structure of a switching system processor in accordance with a preferred embodiment of the present invention.

As shown in FIG. 2, the first processor board 30 operating in an active mode includes a microprocessor 31, a duplexing controller 32, a duplexing channel controller 33, an address FIFO 34, an address buffer 35, a data buffer 36, a data FIFO 37, a memory controller 38 and a memory 39. The second processor board 40 operating in the standby mode includes a microprocessor 41, a bus arbitration unit 42, a processor bus controller 43, a duplexing channel controller 44, an address FIFO 45, an address buffer 46, a data buffer 47, a data FIFO 48, a memory controller 49 and a memory 50.

The duplexing controller 32 of the first processor board 30 controls processing according to a request by the microprocessor 31. If a data is concurrently written into memories 39 and 50, the address and the data are temporarily stored in the address FIFO 34 and the data FIFO 37, respectively. However, if a data is written only into the memory 50 of the second processor board 40, the address and the data are temporarily stored in the address buffer 35 and the data buffer 36, respectively.

When the microprocessor 31 concurrently writes a data into the memories 39 and 50, under the control of the duplexing controller 32, the address FIFO 34 and the data FIFO 37 temporarily store the address and the data and transfer status information of the address FIFO 34 and the data FIFO 37 to the duplexing channel controller 33 on a real-time basis.

When a data is written into or read from the memory 50 of the second processor board 40, the address buffer 35 and the data buffer 36 offer a transfer path for the address and the data signal and transfer status information of the address buffer 35 and the data buffer 36 to the duplexing channel controller 33 and to the duplexing controller 32 on a real-time basis.

Through the arbitration on the duplexing channel according to mutual interaction with the duplexing channel controller 44 of the second processor board 40, the duplexing channel controller 33 receives and transfers a content of the address FIFO 34, the data FIFO 37, the address buffer 35 and the data buffer 36.

Each FIFO 45 and 48, and buffer 46 and 47 of the second processor board 40 temporarily stores the signals received or transferred between the FIFOs 34 and 37 and the buffers 35 and 36 of the first processor board 30 under the control of the duplexing channel controller 44, and transfers status information of the FIFOs 45,48 and buffer 46,47 to the duplexing channel controller 44 and to the processor bus controller 43 on a real-time basis.

According to the status information of the FIFOs 45 and 46 and the buffers 46 and 47, the processor bus controller 43 requests occupation of the processor bus (BUS_S) from the bus arbitration unit 42, and controls the memory controller 49 to perform data reading from or data writing into the memory 50.

The bus arbitration unit 42 monitors the state of the processor bus, and when the processor bus controller 43 requests use of the bus, the bus arbitration unit 42 arbitrates the use of the processor bus between the processor bus controller 43 and the microprocessor 41.

Figure 3:
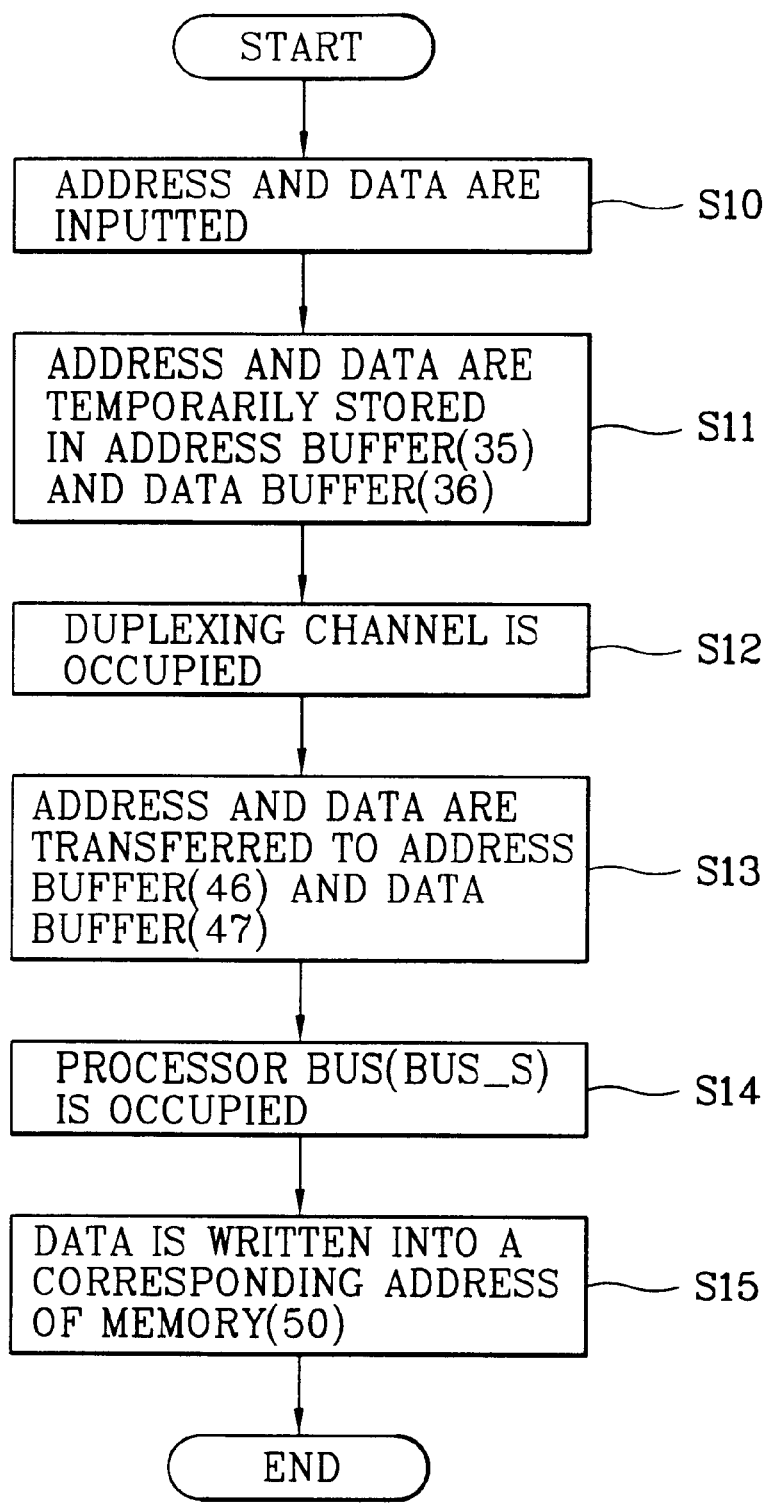
FIG. 3 is a flow chart of a process when a data is written into a memory of a standby mode processor board, in accordance with another preferred embodiment of the present invention.
Figure 4:
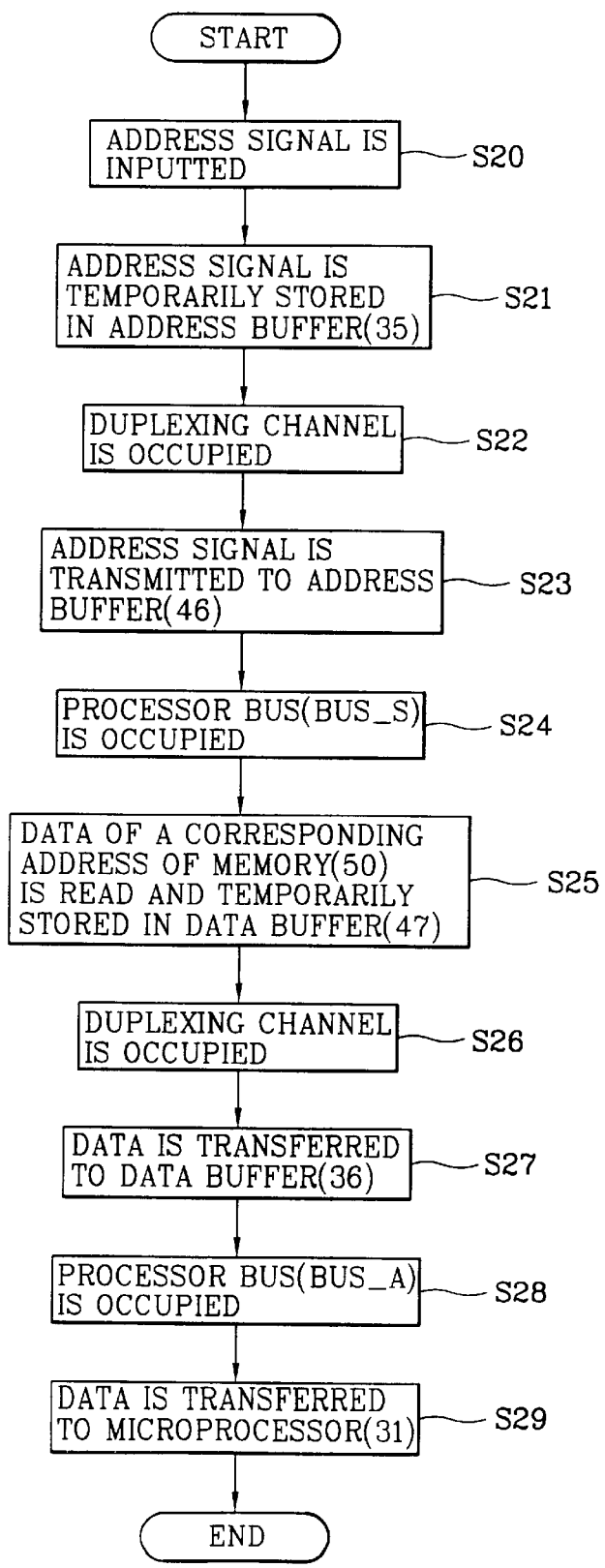
FIG. 4 is a flow chart of a process when a data is read from the memory of a standby mode processor board in accordance with yet another preferred embodiment of the present invention.
Figure 5:
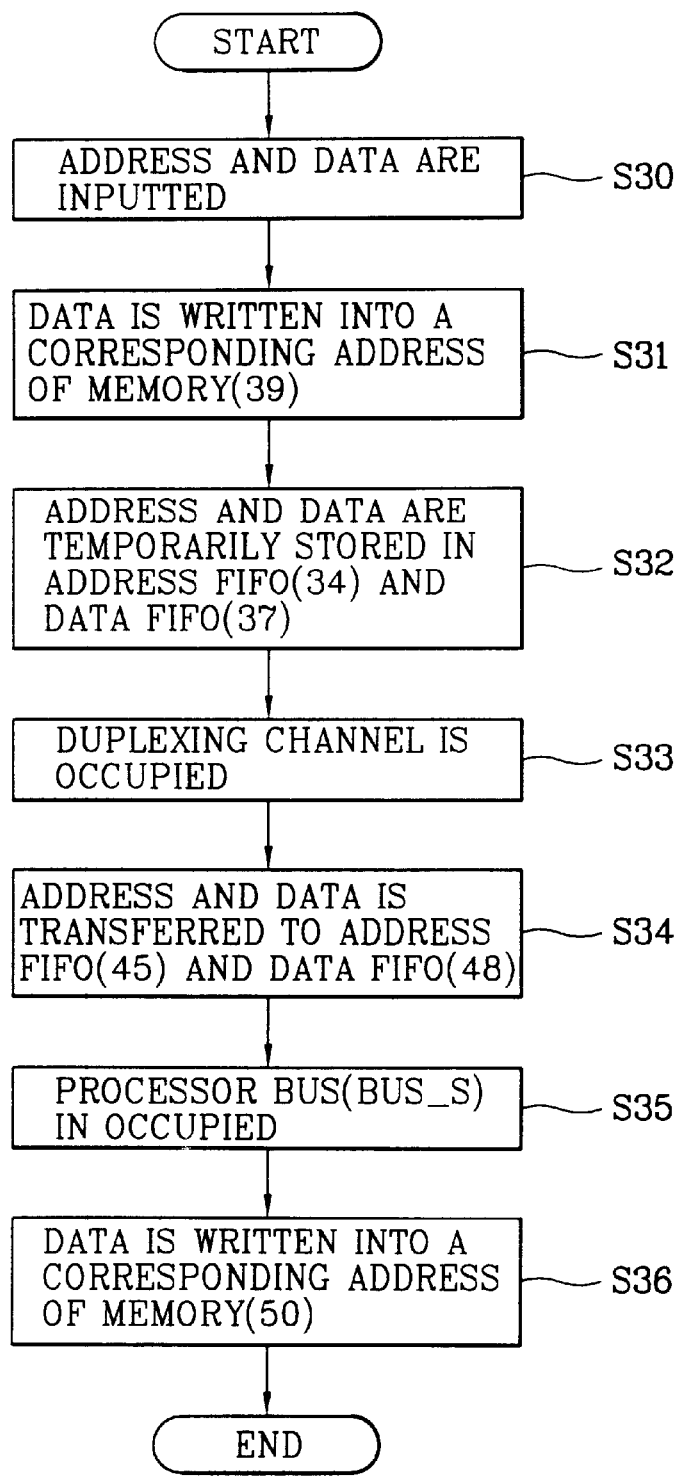
FIG. 5 is a flow chart of a process when a data is concurrently written into each memory of an active mode processor board and a standby mode processor board in accordance with still another preferred embodiment of the present invention.

As shown in FIGS. 3 through 5, implementation of the duplexing method largely includes three processes. FIG. 3 illustrates a flow chart of an allocation process when the microprocessor 31 of the first processor board 30 performs data writing into the memory 50 of the second processor board 40. FIG. 4 illustrates a flow chart of an allocation process when the microprocessor 31 of the first processor board 30 performs data reading from the memory 50 of the second processor board 40. FIG. 5 illustrates a flow chart of an allocation process when data writing is concurrently performed into each memory 39 and 50 of the first and the second processor boards 30 and 40, respectively.

For another preferred embodiment of the present invention, as shown in FIG. 3, the microprocessor 31 of the first processor board 30 is intended to write data into the memory 50 of the second processor board 40. At step S10, a data and an address signal are inputted from the microprocessor 31 to the duplexing controller 32. The duplexing controller 32 controls processing for storing the address and data signal in the address buffer 35 and the data buffer 36, respectively, at step S11.

When the status information of the address buffer 35 and the data buffer 36 is transferred to the duplexing channel controller 33, the duplexing channel controller 33 occupies the duplexing channel through the duplexing channel arbitration with the duplexing channel controller 44 of the second processor board 40, at step S12. At step S13, the duplexing channel controller 33 transfers the content of the address buffer 35 and the data buffer 36 to the address buffer 46 and the data buffer 47 of the second processor 40 through the duplexing channel.

The status information of the buffers 46 and 47 is transferred to the processor bus controller 43, which requests use of the processor bus BUS_S from the bus arbitration unit 42. At step S14, the bus arbitration unit 42 interrupts the use of the bus by the microprocessor 41 to allow the processor bus controller 43 to use the bus so that the processor bus controller 43 controls the memory controller 49, and a data is written into a desired address of the memory 50 through the processor bus BUS_S at step S15.

For yet another preferred embodiment of the present invention, as shown in FIG. 4, the microprocessor 31 of the first processor board 30 is intended to read a data stored in the memory 50 of the second processor board 40. At step S20, as an address signal of a data desired to be read by the microprocessor 31 is inputted to the duplexing controller 32. The duplexing controller 32 controls processing for storing the address signal in the address buffer 35 at step S21.

At step S22, the status information of the address buffer 35 is transferred to the duplexing channel controller 33, which occupies the duplexing channel over the duplexing channel arbitration with the duplexing channel controller 44 of the second processor board 40. At step S23, the duplexing channel controller 33 transfers the content of the address buffer 35 to the address buffer 46 of the second processor board 40, through the duplexing channel. When the status information of the address buffer 46 is transferred to the bus controller 43, the processor bus controller 43 requests use of the processor bus BUS_S from the bus arbitration unit 42.

Then, at step S24, the bus arbitration unit 42 interrupts the use of the bus by the microprocessor 41 to allow the processor bus controller 43 to use the bus. At step S25, the processor bus controller 43 controls the memory controller 49, so that the data stored in a desired address of the memory is read and temporarily stored in the data buffer 47 through the processor bus BUS_S.

At step S26, the status information of the data buffer 47 is transferred to the duplexing channel controller 44, which occupies the duplexing channel based on the duplexing channel arbitration with the duplexing channel controller 33 of the first processor board 30. At step S27, the duplexing channel controller 44 transfers the content of the data buffer 47 to the data buffer 36 of the first processor board 30 through the duplexing channel.

At step S28, the processor bus (BUS_A) is occupied and the status information is transferred to the duplexing controller 32. When the status information of the data buffer 36 is transferred to the duplexing controller 32, the duplexing controller 32 transfers the data to the microprocessor 31 through the processor bus BUS_A, at step S29, thereby ending data reading.

For still another preferred embodiment of the present invention, as shown in FIG. 5, the microprocessor 31 of the first processor board 30 is intended to concurrently write a data into both memories 39 and 50, respectively, which are installed in the first processor board 30 and the second processor board 40. As step S30, a data and its address signal to be duplexed is inputted from the microprocessor 31. At step S31, the data is applied to the memory controller 38 through the processor bus BUS_A, and is written into the memory 39 under the control of the memory controller 38. The address and data signal, as inputted under the control of the duplexing controller 32, are temporarily stored in the address FIFO 34 and the data FIFO 37, respectively, at step S32.

At step S33, the status information of the address FIFO 34 and the data FIFO 37 is transferred to the duplexing channel controller 33, which occupies the duplexing channel based on the duplexing channel arbitration with the duplexing channel controller 44 of the second processor board 40. At step S34, the duplexing channel controller 33 transfers the content of the address FIFO 34 and the data FIFO 37 through the duplexing channel to the address FIFO 45 and the data FIFO 48 of the second processor board 40, respectively.

When the status information of the FIFOs 45 and 48 is transferred to the processor bus controller 43, the processor bus controller 43 requests use of the processor bus BUS_S from the bus arbitration unit 42. Then, at step S35, the bus arbitration unit 42 interrupts the use of the bus by the microprocessor 41 to allow the processor bus controller 43 to use the bus. At step S36, the processor bus controller 43 controls the memory controller 49 so that data is written into a corresponding address of the memory 50 through the processor bus BUS_S, thereby ending concurrent writing of the data into each memory 39 and 50 of the first processor board 30 and the second processor board 40, respectively.

As so far described, according to the duplexing method of the switching system processor of the present invention, only the duplexing controller 32 of the active mode processor and the processor bus controller 43 of the standby mode processor are operated in relation to the clock speed of the processor bus of the microprocessor, and the duplexing channel between the two processors is independently operated as being completely separated from the processor bus of each FIFO and buffer, so that the duplexing channel controller uses a duplexing channel clock different than the clock of the processor bus to control the duplexing channel between the two processors.

Namely, since the processor bus of the microprocessor and the duplexing channel between the two processors are independently operated by using different clocks, the clock speed of the duplexing channel is not determined by the microprocessor used for the switching system processor, and thus, a high-performance microprocessor requiring a high speed processor bus clock can be readily adopted for use.

The foregoing embodiments and advantages are merely exemplary and are not to be construed as limiting the present invention. The active mode processor board and the standby mode processor board for implementing duplexing operations of the switching system processor in accordance with the present invention have substantially the same construction. For convenience of explanation, FIG. 2 shows blocks required for performing the duplexing when the first processor board 30 is operating in an active mode and the second processor board 40 is operating in a standby mode. A skilled artesian would readily understand that the preferred embodiment of the present invention are also applicable when the first processor board 30 is in a standby mode and the second processor board is in the active mode. In addition, the present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A switching system processor, comprising:
   a first processor board coupled to a first microprocessor and a first memory via a first bus;
   a second processor board coupled to a second microprocessor and a second memory via a second bus; and
   a duplex channel device coupled to the first bus and the second bus, that accesses a duplex channel, such that data is transferred between at least one of the first microprocessor and the second microprocessor, and at least one of the first memory and the second memory, wherein the first microprocessor and the second microprocessor operate at a first clock and the duplex channel is operated at a second clock, which is different from the first clock.

2. The switching system of claim 1, wherein the duplex channel device includes:
   a first storage device coupled to the first processor board, that temporarily stores the data transferred between the at least one of the first microprocessor and the second microprocessor, and the at least one of the first memory and the second memory;
   a second storage device coupled to the second processor board, that temporarily stores the data transferred between the at least one of the first microprocessor and the second microprocessor, and the at least one of the first memory and the second memory;
   a first duplex channel controller coupled to the first storage device, that arbitrates the use of the duplex channel and controls the transferring of the data between the first storage device and the second storage device; and
   a second duplex channel controller coupled to the second storage device, that arbitrates the use of the duplex channel with the first duplex channel controller and controls the transferring of the data between the second storage device and the first storage device.

3. The switching system of claim 2, wherein the first storage device includes
   a first buffer that provides a transfer path for the data transferred between the at least one of the first microprocessor and the second microprocessor, and the at least one of the first memory and the second memory, and that transfers a status information of the first storage device to the first duplex channel controller, and
   a first FIFO that temporarily stores the data transferred between the at least one of the first microprocessor and the second microprocessor, and the at least one of the first memory and the second memory, and that transfers a status information of the first FIFO to the first duplex channel controller when the data is concurrently transferred to the first memory and the second memory; and
the second storage device includes
   a second buffer that provides a transfer path for the data transferred between the at least one of the first microprocessor and the second microprocessor, and the at least one of the first memory and the second memory, and that transfers a status information of the second storage device to the second duplex channel controller, and
   a second FIFO that temporarily stores the data transferred between the at least one of the first microprocessor and the second microprocessor, and the at least one of the first memory and the second memory, and that transfers a status information of the second FIFO to the second duplex channel controller when the data is concurrently transferred to the first memory and the second memory.

4. The switching system of claim 3, wherein
   the first buffer includes a first address buffer that provides a transfer path for an address signal of the data, and a first data buffer that provides a transfer path for a data signal of the data,
   the second buffer includes a second address buffer that provides a transfer path for the address signal of the data, and a second data buffer that provides a transfer path for the data signal of the data,
   the first FIFO includes a first address FIFO that temporarily stores the address signal of the data when the data is concurrently transferred to the first memory and the second memory, and a first data FIFO that temporarily stores the data signal of the data when the data is concurrently transferred to the first memory and the second memory, and
   the second FIFO includes a second address FIFO that temporarily stores the address signal of the data when the data is concurrently transferred to the first memory and the second memory, and a second data FIFO that temporarily stores the data signal of the data when the data is concurrently transferred to the first memory and the second memory.

5. The switching system of claim 4, wherein the first duplex channel controller receives and transfers a content of any of the first address FIFO, the first data FIFO, the first address buffer and the first data buffer, and the second duplex channel controller receives and transfers a content of any of the second address FIFO, the second data FIFO, the second address buffer and the second data buffer.

6. The switching system of claim 3, further comprising:
   a first bus controller that controls the transferring of the data to and from the first microprocessor and the first memory via the first bus; and
   a second bus controller that controls the transferring of the data to and from the second microprocessor and the second memory via the second bus.

7. The switching system of claim 6, wherein the second bus controller monitors and arbitrates a bus allocation of the second bus with the second microprocessor in accordance with a status of the second buffer and the second FIFO.

8. The switching system of claim 6, further comprising:
   a first memory controller coupled to the first memory, that controls reading an writing operations of the first memory in accordance with the first bus controller; and
   a second memory controller coupled to the second memory, that controls reading and writing operations of the second memory in accordance with the second bus controller.

9. The switching system of claim 1, wherein the first processor board is operated in an active mode, and the second processor board is operated in a standby mode.

10. A duplex channel device that accesses a duplex channel to transfer data to a first peripheral device via a first bus and a second peripheral device via a second bus, comprising:
   a first storage device coupled to a first processor board and the first bus, that temporarily stores the data;
   a second storage device coupled to a second processor board and the second bus, that temporarily stores the data;
   a first duplex channel controller coupled to the first storage device and a duplex channel, that arbitrates the use of the duplex channel and controls the transferring of the data between the first storage device and the second storage device; and
   a second duplex channel controller coupled to the second storage device and the duplex channel, that arbitrates the use of the duplex channel with the first duplex channel controller and controls the transferring of the data between the second storage device and the first storage device, wherein the first duplex channel controller and the second duplex channel controller operate the duplex channel at a frequency independent of the first and second peripheral devices.

11. The duplex channel device of claim 10, wherein the first storage device includes
- a first buffer that provides a transfer path for the data transferred between the first peripheral device and the second storage device, and that transfers a status information of the first storage device to the first duplex channel controller, and
- a first FIFO that temporarily stores the data transferred between the first peripheral device and the second storage device, and that transfers a status information of the first FIFO to the first duplex channel controller when the data is concurrently transferred to the first peripheral device and the second peripheral device; and the second storage device includes
- a second buffer that provides a transfer path for the data transferred between the second peripheral device and the first storage device, and that transfers a status information of the second storage device to the second duplex channel controller, and
- a second FIFO that temporarily stores the data transferred between the second peripheral device and the first storage device, and that transfers a status information of the second FIFO to the second duplex channel controller when the data is concurrently transferred to the first peripheral device and the second peripheral device.

12. The duplex channel device of claim 11, wherein the first peripheral device includes a first microprocessor and a first memory, and the second peripheral device includes a second microprocessor and a second memory.

13. The duplex channel device of claim 11, wherein
the first buffer includes a first address buffer that provides a transfer path for an address signal of the data, and a first data buffer that provides a transfer path for a data signal of the data,
the second buffer includes a second address buffer that provides a transfer path for the address signal, and a second data buffer that provides a transfer path for the data signal,
the first FIFO includes a first address FIFO that temporarily stores the address signal when the data is concurrently transferred to the first peripheral device and the second peripheral device, and a first data FIFO that temporarily stores the data signal when the data is concurrently transferred to the first peripheral device and the second peripheral device, and
the second FIFO includes a second address FIFO that temporarily stores the address signal when the data is concurrently transferred to the first peripheral device and the second peripheral device, and a second data FIFO that temporarily stores the data signal when the data is concurrently transferred to the first peripheral device and the second peripheral device.

14. The duplex channel device of claim 13, wherein the first duplex channel controller receives and transfers a content of any of the first address FIFO, the first data FIFO, the first address buffer and the first data buffer, and the second duplex channel controller receives and transfers a content of any of the second address FIFO, the second data FIFO, the second address buffer and the second data buffer.

15. The duplex channel device of claim 10, wherein the first processor board is operated in an active mode, and the second processor board is operated in a standby mode.

16. A method of duplexing a switching system processor including a first processor board coupled to a first microprocessor and a first memory via a first bus, and a second processor board coupled to a second microprocessor and a second memory via a second bus, comprising:
- (a) transferring data, including an address signal and a data signal, to and from at least one of the first and second microprocessors at a first clock; and
- (b) transferring the data between the at least one of the first and second microprocessors and at least one of the first and second memories, via first and second duplex channel controllers coupled to a duplex channel, at a second clock, which is different from the first clock.

17. The method of claim 16, wherein the step (b) further comprises:
- temporarily storing the address signal and the data signal in a first address buffer and a first data buffer under the control of a duplexing controller when the data is inputted from the first microprocessor;
- transferring a status information of the first address buffer and the first data buffer to the first duplexing channel controller coupled to the first processor board;
- occupying the duplex channel;
- transferring the address signal and the data signal via the duplexing channel to a second address buffer and a second data buffer, respectively;
- transferring a status information of the second address buffer and the second data buffer to a second bus controller and occupying the second bus;
- writing data into the second memory via the second bus.

18. The method of claim 16, wherein the step (b) further comprises:
- temporarily storing the address signal in a first address buffer under the control of a duplexing controller when the data is to be read from the second memory;
- transferring a status information of the first address buffer to the first duplex channel controller;
- occupying the duplex channel;
- transferring the address signal via the duplex channel to a second address buffer;
- transferring a status information of the second address buffer to the second bus controller and occupying the second bus;
- reading data written from the second memory via the second bus and temporarily storing the data in a second data buffer;
- transferring a status information of the second data buffer to the second duplex channel controller and occupying the duplex channel;
- transferring the data via the duplex channel to the first data buffer;
- transferring the status information of the first data buffer to the duplexing controller; and
- transferring the data via the first bus to the first microprocessor.

19. The method of claim 16, wherein the step (b) further comprises:
- writing the data from the first microprocessor into the first memory when the data is intended to be written to both the first and second memories;
- temporarily storing the address signal and the data signal in a first address FIFO and a first data FIFO, respectively;
- transferring a status information of the first address FIFO and the first data FIFO to the first duplex channel controller;

occupying the duplex channel;

transferring the address signal and the data signal to a second address FIFO and a second data FIFO, respectively, via the duplexing channel;

transferring a status information of the second address FIFO and the second data FIFO to a second bus controller and occupying the second bus; and writing the data into the second memory via the second bus.

* * * * *